June 12, 1934.   D. E. GOMMEL   1,962,588
HACK SAW MACHINE
Filed May 31, 1932   2 Sheets-Sheet 2
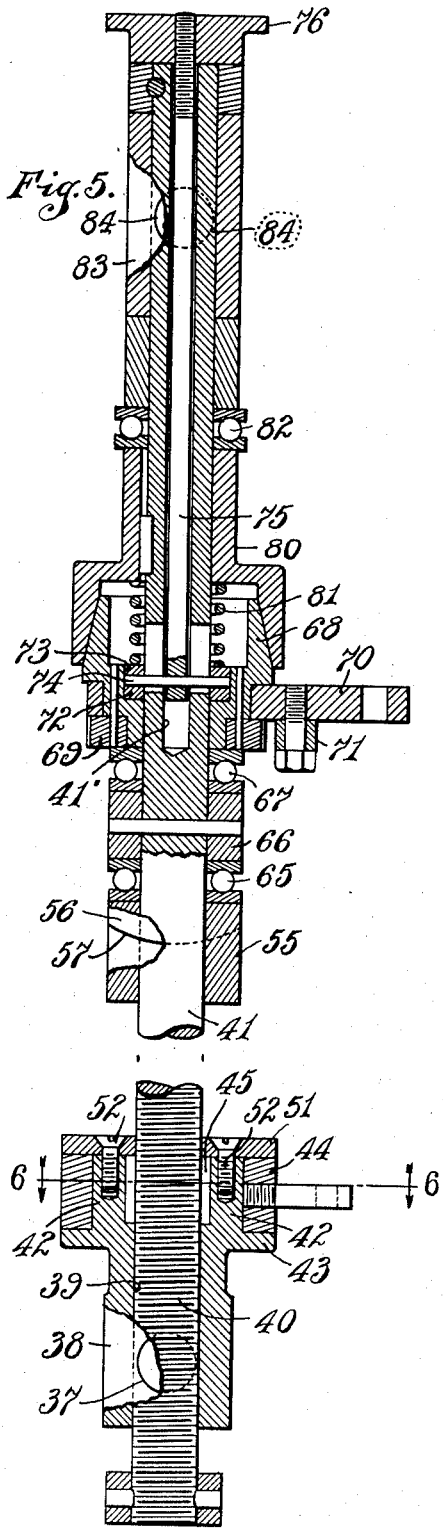
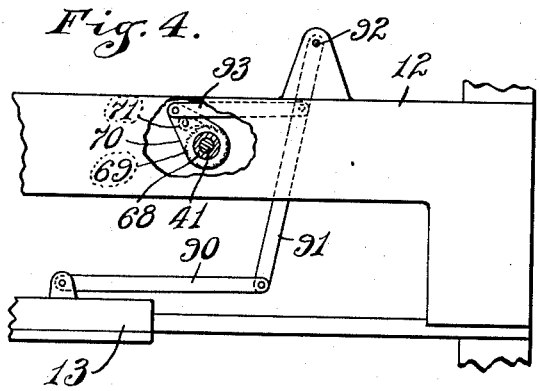
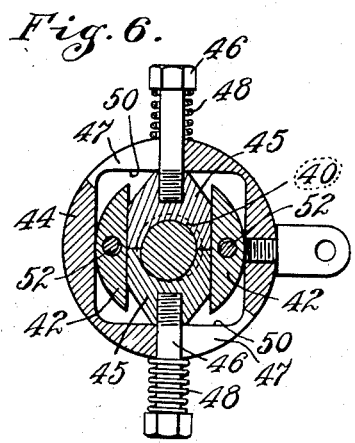
INVENTOR.
Dewey E. Gommel,
BY
Hood & Hahn
ATTORNEYS

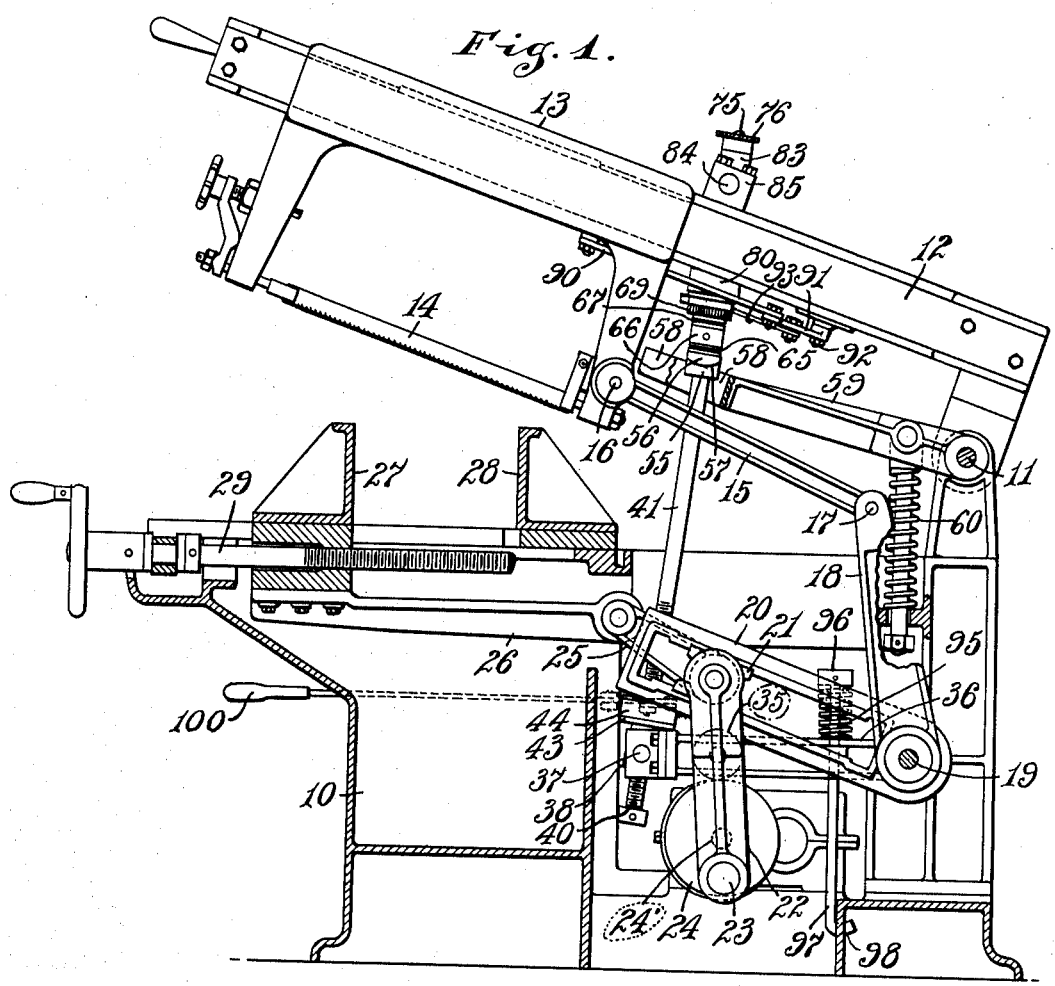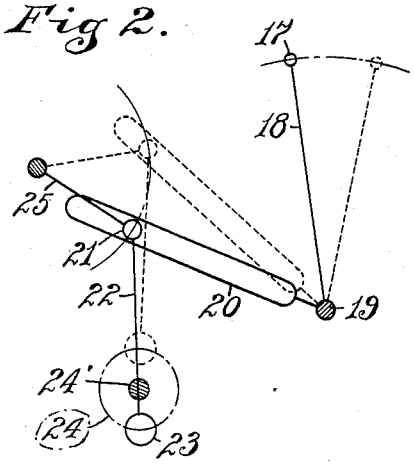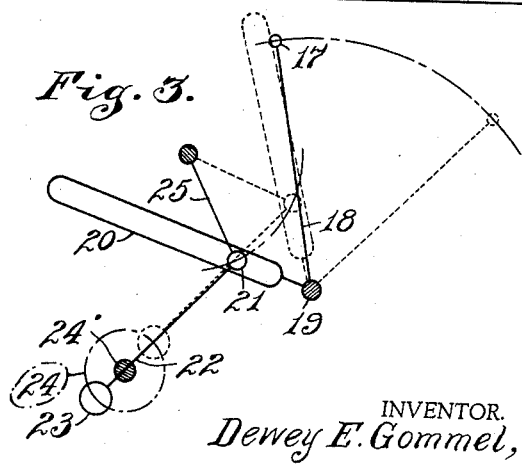

UNITED STATES PATENT OFFICE 1,962,588

HACK SAW MACHINE

Dewey E. Gommel, Indianapolis, Ind., assignor to E. C. Atkins and Company, Indianapolis, Ind., a corporation of Indiana Application May 31, 1932, Serial No. 614,465

6 Claims. (Cl. 29—73)

The object of my invention is to provide improved means, in a power hack saw, by which the stroke of the saw blade may be automatically adjusted, in accordance with the cutting-plane-thickness of the material to be operated upon, so that the blade stroke and consequent cutting capacity will be maximum.

A further object of my invention is to provide improved means for automatically advancing the cutting blade transversely of its cutting edge and for supporting the blade frame from its work on its return strokes.

The accompanying drawings illustrate my invention.

Fig. 1 is a vertical section of a machine embodying my invention;

Fig. 2 a diagram showing one extreme of adjustment;

Fig. 3 a similar diagram showing the other extreme of adjustment;

Fig. 4 a fragmentary diagram in partial horizontal section, of the feeding means;

Fig. 5 a vertical section through the blade feeding and supporting means, and

Fig. 6 a section on line 6—6 of Fig. 5.

In the drawings 10 indicates the main frame of the machine on which is hinged, on shaft 11, a guide bar 12, (comprising two parallel portions, as is usual) upon which is slidably mounted the blade-frame 13 in which blade 14 may be secured in a well-known manner.

The frame 13 is reciprocated by the following mechanism. Link 15 is pivoted at one end 16 to frame 13, and at the other end 17 to the upper end of a lever 18 carried by rock-shaft 19 journalled in frame 10. Secured to rock shaft 19 is a slotted lever 20 in which is slidably mounted a cross-head 21 to which is pivoted the outer end of a pitman 22 journaled on the wrist-pin 23 carried by a cam 24 on the main drive shaft 24' to which power is applied in any suitable manner. Pivoted to cross-head 21 is one end of a link 25 which is pivoted at its other end to an arm 26 attached to the vise-head 27 which is slidably mounted on frame 10 in opposition to the fixed vise-head 28 which is mounted on frame 10. Head 27 is adjusted toward and from head 28 by means of screw 29 journaled on frame 10.

The above-described parts are so proportioned and assembled, as shown approximately to scale in Fig. 1, that, at one extreme of its stroke, the slot of lever 20 is tangential to a circle struck from the center of shaft 24, and cross-head 21 will lie at the outer extreme of its stroke in said slot when head 27 is set most distant from head 28. In this position of adjustment rock shaft 19 will be given its least oscillation, as indicated in Fig. 2, and the consequent stroke of blade 14 will be approximately equal to the toothed length of blade 14 less the distance between heads 27 and 28.

From this position of adjustment, as shown in Fig. 1, head 27 may be shifted toward head 28, to thereby shift cross-head 21 toward shaft 19, with a very small consequent rocking of shaft 19 and concurrent movement of frame 13.

When head 27 is moved close to head 28 block 21 will occupy a position close to shaft 19 and rotation of shaft 24' will result in a maximum oscillation of shaft 19, as indicated in Fig. 3, and this oscillation will be such that the stroke of blade 14 will again be equal to the toothed-length of the blade less the distance between the heads 27 and 28. For all intermediate positions of head 27 the blade stroke will closely approximate the toothed length of the blade less the distance between heads 27 and 28.

The periphery of cam 24 is made up of two sections, of approximately equal angular extent, one of which has a slightly larger radius than the other, in a well-known manner. Resting upon the periphery of cam 24 is a roller 35 journaled on an arm 36 which is pivoted on shaft 19. Journaled in the outer end of arm 36 are the diametrical trunnions 37 of a nut-block 38 which has a smooth bore 39 which is freely journaled on the threaded lower end 40 of the strut 41 which supports the unbalanced weight of arm 12 and the parts carried thereby.

The nut-block 38 is provided at its upper end with two diametrically opposed upwardly-projecting fingers 42, 42 which rise from an annular flange 43 upon which is seated a cam-ring 44 which encircles the fingers 42.

Between fingers 42, 42 are two mating nut sections 45, 45 which are internally threaded to engage threads 40. Each nut section 45 is provided with a headed pin 46 which is projected through a circumferential slot 47 in ring 44, and a spring 48 biases the nut section to retracted position where it will be free from threads 40.

Ring 44 is chambered to form cam walls 50 engaging the nut sections in such manner, as shown, that a 45 degree oscillation of ring 44 in either direction from the position in Fig. 6 will permit springs 48 to retract the nut sections from threads 40.

A cover-plate 51, attached to the upper ends of fingers 42 by screws 52, serves to retain ring 44 in place.

Journaled on strut 41, intermediate its ends, is a collar 55 having diametrical fingers 56 having rounded lower faces 57 which rest upon the upper edges of the spaced fingers 58, 58 of an arm 59 pivoted on shaft 11 and yieldingly supported on a spring 60 which, however, is only strong enough to support such portion of the unbalanced weight of arm 12 and frame 13 as is not needed to develop required pressure for the cutting action of blade 14.

Resting on ball bearing 65, on collar 55, is a collar 66 secured to strut 41. Resting on collar 66 is a ball bearing 67 which supports a friction head 68 sleeved on strut 41 and carrying a ratchet wheel 69. Journaled on head 68 is a ratchet arm 70 carrying a pawl 71 engaging ratchet wheel 69. Splined on strut 41 is a collar 72 which is seated in a cup 73 formed in head 68. The spline-pin 74 passes diametrically across the bore 41' in the upper part of strut 41 and secured to this pin is a rod 75 the upper end of which is threaded and carries a knurled head 76, which engages the upper end of strut 41.

Splined on strut 41 is a friction cup 80 having a conical friction face which cooperates with the conical friction face of head 68.

A compression spring 81 is interposed between collar 72 and cup 80.

Resting upon cup 80 is a ball bearing 82 which supports a trunnion collar 83 provided with diametrical trunnions 84, 84, which are journaled in a bearing block 85 attached to arm 12.

In order to manipulate the ratchet-arm 70 a link 90 is pivoted to frame 13 and to a lever 91 which is pivoted at 92 to arm 12. A link 93 connects lever 91 with arm 70.

The work, being clamped between the vise heads, the movement of head 27 automatically adjusts cross-head 21 in the slot of arm 20 to adjust the blade-driving parts so that the blade 14 will be given the fullest possible and most effective amplitude of reciprocation. The operator then swings cam-ring 44 to retract the nut-halves 45 from threads 40 so that blade 14 may rest upon the work, whereupon cam-ring 44 is returned to its initial position permitting the nut-halves 45 to again engage threads 40.

At the end of each cutting stroke (toward the right, Fig. 1) the high part of cam 24 raises strut 41 to lift the blade from the work and hold it in that position during the return stroke.

During the cutting stroke ratchet arm 70 is moved to advance friction head 68, which, acting on cup 80 turns strut 41 in its nut-halves 45 to permit blade 14 to descend as rapidly as the cutting action will permit, the rate of descent being retarded, if necessary, because, if the cutting action is not sufficiently rapid, spring 81 will cause sufficient release of head 68 from cup 80 to permit a proper part of the ratchet movement to be ineffective.

Spring 81 is of sufficient strength to sustain the weight of arm 12 and the saw frame and therefore adjustment of the knurled head 76 will control, with accuracy, the pressure exerted laterally by those parts on the saw blade to cause said blade to bite into the work at the most effective rate.

In order to hold roller 35 on cam 24, I provide a spring 95 which rests on arm 36 and abuts a collar 96 at the upper end of a rod 97 which passes down freely through arm 36 and is detachably hooked into frame 10, as indicated at 98, (Fig. 1).

Cam ring 44 may be oscillated by means of rod 100 connected thereto.

I claim as my invention:

1. A hack saw comprising a main frame, provided with a pair of work-holding jaws, one of which is movable toward and from the other, means by which the movable jaw may be adjusted relative to its fellow, a saw-supporting arm hinged on the main frame and projected across said jaws, a saw-carrying frame slidably mounted on said arm, a pair of lever arms connected for unitary oscillation, a link connecting one of said arms and the saw frame, a cross-head slidably mounted on the other arm, a link connecting said cross-head and the movable jaw, a pitman pivoted to said cross-head, and means by which said pitman may be reciprocated.

2. A hack saw comprising a main frame having a pair of work-holding jaws, one of which is movable relative to the other, means by which the movable jaw may be adjusted relative to its fellow, a saw-supporting arm hinged upon the main frame and projected transversely above and across said jaws, a saw frame slidably mounted on said arm, a drive shaft journaled in the main frame below the jaws, a lever arm pivoted on the main frame below the jaws and above the drive shaft and projected over the drive shaft toward the jaws, a cross-head slidably mounted on said lever arm substantially radially of its pivot, a pitman pivoted upon said cross-head and associated with the drive shaft for reciprocation thereby, a link connecting said cross-head and the movable jaw, an upwardly-projecting lever arm rigidly associated with the first-mentioned lever arm, and a link connecting said last-mentioned lever arm with the saw frame.

3. A hack saw comprising a main frame, having a pair of work-holding jaws, a saw-supporting arm hinged on the main frame and projected above and across said jaws, a saw-frame slidably mounted on said arm, a shaft journaled in said frame, a cam carried by said shaft, an arm pivoted on said frame and supported by said cam, and a strut extending between said arms, said strut comprising a threaded stem, a nut engaging the threads thereof and supported by the cam-supported arm, an annular friction element journaled on the stem, a mating annular friction element non-rotatively secured to the stem above the first-mentioned friction element and resting thereon and supporting the saw-carrying arm, and means by which one of said friction elements may be rotated.

4. A hack saw comprising a main frame provided with work-holding means, a saw-supporting arm mounted on the main frame and projected over the work-holding means and movable toward and from said means, a saw-frame slidably mounted on said arm, a strut comprising a main stem having a threaded lower portion, a nut engaging said threaded portion, a mating pair of annular friction elements arranged between the nut and the saw-supporting arm, one journaled on the stem and the other non-rotatively secured to the stem, an element journalled on the strut and axially supported thereon and supporting the saw-carrying frame, and means carried by the saw-supporting arm and actuated by the saw-frame by which the journaled friction element may be rotated.

5. A hack saw comprising a main frame provided with work-holding means, a saw-supporting arm mounted on the main frame and projected over the work-holding means and movable toward and from said means, a strut for supporting said saw-carrying arm, said strut comprising a main stem having a threaded lower portion, a nut engaging said threaded portion, an annular friction element journaled on the main stem, means by which said element may be rotated, a second annular friction element splined on the main stem and mating with the first friction element and supporting the saw-carrying arm, a spring interposed between the two friction elements and abutting the upper friction element, an abutment for the lower end of said spring, and means by which said abutment may be axially adjusted on the main stem.

6. A hack saw comprising a main frame having work-holding means, a saw-carrying arm hinged on the main frame and projecting over the work-holding means, an adjustable-length strut supporting the saw-carrying arm, a saw-frame reciprocably mounted on the saw-carrying arm, means for reciprocating said saw-frame, means by which said strut may be axially reciprocated in synchronism with the saw frame, and a spring-supported arm mounted on the main frame and engaging the strut to partially support the weight of the parts primarily supported by the strut.

DEWEY E. GOMMEL.